(12) United States Patent
Hagen et al.

(10) Patent No.: US 9,841,131 B2
(45) Date of Patent: Dec. 12, 2017

(54) CONSTRUCTION SYSTEM FOR A CONNECTION ARRANGEMENT FOR MEDIA LINES

(71) Applicant: VOSS Automotive GmbH, Wipperfürth (DE)

(72) Inventors: Harald Hagen, Wipperfürth (DE); Adrian Klehr, Neuenrade (DE); Markus Hasberg, Wipperfürth (DE)

(73) Assignee: VOSS Automotive GmbH, Wipperfürth (DE)

( * ) Notice: Subject to any disclaimer, the term of this patent is extended or adjusted under 35 U.S.C. 154(b) by 85 days.

(21) Appl. No.: 14/427,325

(22) PCT Filed: Sep. 11, 2013

(86) PCT No.: PCT/EP2013/068823
§ 371 (c)(1),
(2) Date: Mar. 11, 2015

(87) PCT Pub. No.: WO2014/044585
PCT Pub. Date: Mar. 27, 2014

(65) Prior Publication Data
US 2015/0240979 A1    Aug. 27, 2015

(30) Foreign Application Priority Data
Sep. 18, 2012   (DE) .................. 10 2012 108 791

(51) Int. Cl.
*F16L 17/00*    (2006.01)
*F16L 37/091*    (2006.01)
(52) U.S. Cl.
CPC .................. *F16L 37/091* (2013.01)
(58) Field of Classification Search
USPC .................. 285/340, 374, 220, 119, 12
See application file for complete search history.

(56) References Cited

U.S. PATENT DOCUMENTS 4,123,090 A * 10/1978 Kotsakis ............. F16L 37/0915
285/340
4,288,113 A * 9/1981 Saulnier ............. F16L 37/0915
285/238

(Continued)

FOREIGN PATENT DOCUMENTS

DE    2630964 A1    1/1978
DE    38 22 159 A1    1/1990

(Continued)

OTHER PUBLICATIONS

PCT International Search Report—Apr. 2, 2015.

(Continued)

*Primary Examiner* — Aaron Dunwoody
(74) *Attorney, Agent, or Firm* — Eric J. Sosenko; Jonathan P. O'Brien; Honigman Miller Schwartz and Cohn LLP

(57) ABSTRACT

A construction system for a connection arrangement for media lines, wherein the connection arrangement has a connection body with a receiving opening for a media line and with internal parts for interacting with the media line and providing axial guidance, mechanical locking to prevent detachment, peripheral sealing and, where applicable, internal radial support. Various internal parts can optionally be inserted into the connection body, which is designed to be identical in respect of the internal contour of the receiving opening, and for a particular maximum external line diameter, in order to adapt to at least two dissimilar media lines having different cross-sectional dimensions. The internal parts are adapted, on the one hand, to the permanently identical internal contour of a receiving opening of the connection body and, on the other hand, to the cross-sectional dimension of one of the dissimilar media lines.

16 Claims, 6 Drawing Sheets

(56) References Cited

U.S. PATENT DOCUMENTS

| | | | |
|---|---|---|---|
| 4,545,604 A | 10/1985 | Braathen | |
| 5,269,566 A * | 12/1993 | Do | F16L 19/005 285/220 |
| 5,437,483 A * | 8/1995 | Umezawa | F16L 37/091 285/308 |
| 5,487,572 A | 1/1996 | Combot-Courrau et al. | |
| 6,612,623 B2 | 9/2003 | Salomon-Bahls | |
| 7,380,836 B2 | 6/2008 | Bogdanowicz et al. | |
| 7,621,569 B2 * | 11/2009 | Anthoine | F16L 37/0915 285/3 |
| 7,900,973 B2 * | 3/2011 | Herberg | F16L 13/142 285/104 |
| 8,491,012 B2 * | 7/2013 | LeQuere | F16L 37/091 285/340 |
| 8,608,205 B2 * | 12/2013 | Lai | B25B 27/10 285/307 |
| 8,844,980 B2 * | 9/2014 | Le Quere | F16L 37/091 285/316 |
| 2004/0070198 A1 * | 4/2004 | Rohrig | F16L 37/0915 285/39 |
| 2004/0245766 A1 * | 12/2004 | Vallee | F16L 37/0915 285/39 |
| 2006/0061101 A1 | 3/2006 | Bogdanowicz et al. | |
| 2006/0125235 A1 * | 6/2006 | Andre | F16L 37/091 285/340 |
| 2007/0108764 A1 * | 5/2007 | Nicolino | F16L 37/091 285/340 |
| 2011/0068573 A1 | 3/2011 | Muto et al. | |
| 2015/0145248 A1 * | 5/2015 | Hagen | F16L 37/091 285/340 |
| 2015/0145249 A1 * | 5/2015 | Taneya | F16L 37/091 285/340 |
| 2015/0345683 A1 * | 12/2015 | Crompton | F16L 37/0915 285/340 |

FOREIGN PATENT DOCUMENTS

| | | |
|---|---|---|
| DE | 43 26 693 A1 | 2/1995 |
| DE | 694 13 582 T2 | 3/1999 |
| DE | 200 17 921 U1 | 4/2002 |
| DE | 103 02 358 A1 | 4/2004 |
| DE | 10 2004 046 548 B3 | 6/2005 |
| EP | 0 160 559 A1 | 11/1985 |
| EP | 1 199 506 A1 | 4/2004 |
| GB | 2 231 931 A | 11/1990 |
| GB | 2 393 769 A | 4/2004 |
| NL | 198101127 A | 10/1982 |

OTHER PUBLICATIONS

European Patent Office, HV Rijswijk, NL, International Search Report of International Application No. PCT/EP2013/068823, dated Oct. 17, 2013, 3 pages.

* cited by examiner

CONSTRUCTION SYSTEM FOR A CONNECTION ARRANGEMENT FOR MEDIA LINES

BACKGROUND

1. Field of the Invention

The invention relates to a novel building system for a connection device for media lines, wherein the connection device has a connecting element with a receiving opening for line end of a media line to be inserted, as well as with inner parts mounted within the receiving opening for interaction with the media line for axial control, mechanical locking to prevent release, peripheral sealing, and, if required, inner radial support.

2. Description of Related Art

"Media lines" are basically understood to be pipelines or flexible lines for any type of flow and/or pressurizing media, such as gases and liquids, but in particular pipelines made from plastic.

Connection devices that allow quick and in particular releasable connection of media lines by means of a simple insertion into a receiving opening are basically known. Patent publications EP 0 616 161 B1, EP 0 160 559 B1 and EP 1 199 506 A1 are merely referred to as examples.

Such connection devices must be made available for practical use for a plurality of media lines with different cross-sectional dimensions. Until now, a separate connection device with all its individual parts was necessary for each outer and/or inner line diameter. This leads to very high expenses for production, warehousing, and logistics.

The problem addressed by the invention is to reduce expenses for such connection devices for accommodating the dimensions of different line cross sections.

SUMMARY

This is attained, according to the invention, by providing a connection device kit that includes a connecting element and optionally different inner parts, that are identical with regard to the inner contour of the receiving opening, can be used in the connecting element, which is dimensioned for a specific maximum outer line diameter, for adaptation to at least two media lines that differ in their cross-sectional dimensions. The inner parts are adapted, on the one hand, to the always identical inner contour of the receiving opening of the connecting element as well as, on the other hand, to the cross-sectional dimension of one of the different media lines. Different inner parts are particularly advantageously optionally used with the same connecting element for adaptation to at least three, and up to preferably six, media lines that differ in their cross-sectional dimensions.

Connection device kits used in the manner of building blocks can be advantageously made available for several different media lines with one and the same connecting element by means of the building system according to the present invention in that only the specific inner parts that are adapted to the media line are used. Since the connecting element is the most complex and cost-intensive component of the connection device, the invention results in economical production of different designs that can be adapted to different media lines. Different connecting elements, which are then designed for respectively differing maximum outer line diameters, can however furthermore also be made available. Groups, so-called "clusters," are formed with the respectively corresponding inner parts that are designed according to the invention, wherein each connecting element is suitable for several different media lines within a specific design size range. In this way, connection device kits with only a few components can be conceived for a large spectrum of cross-sectional dimensions of different media lines; above all the number of cost-intensive connecting elements is reduced because each connecting element is suitable for a group of several different media lines.

BRIEF DESCRIPTION OF THE DRAWINGS

The invention will be explained in further detail in the following, with reference to the preferred exemplary embodiments shown in the drawings, wherein.

The same parts are always identified with the same reference signs in the drawings.

DETAILED DESCRIPTION

Figure 1:
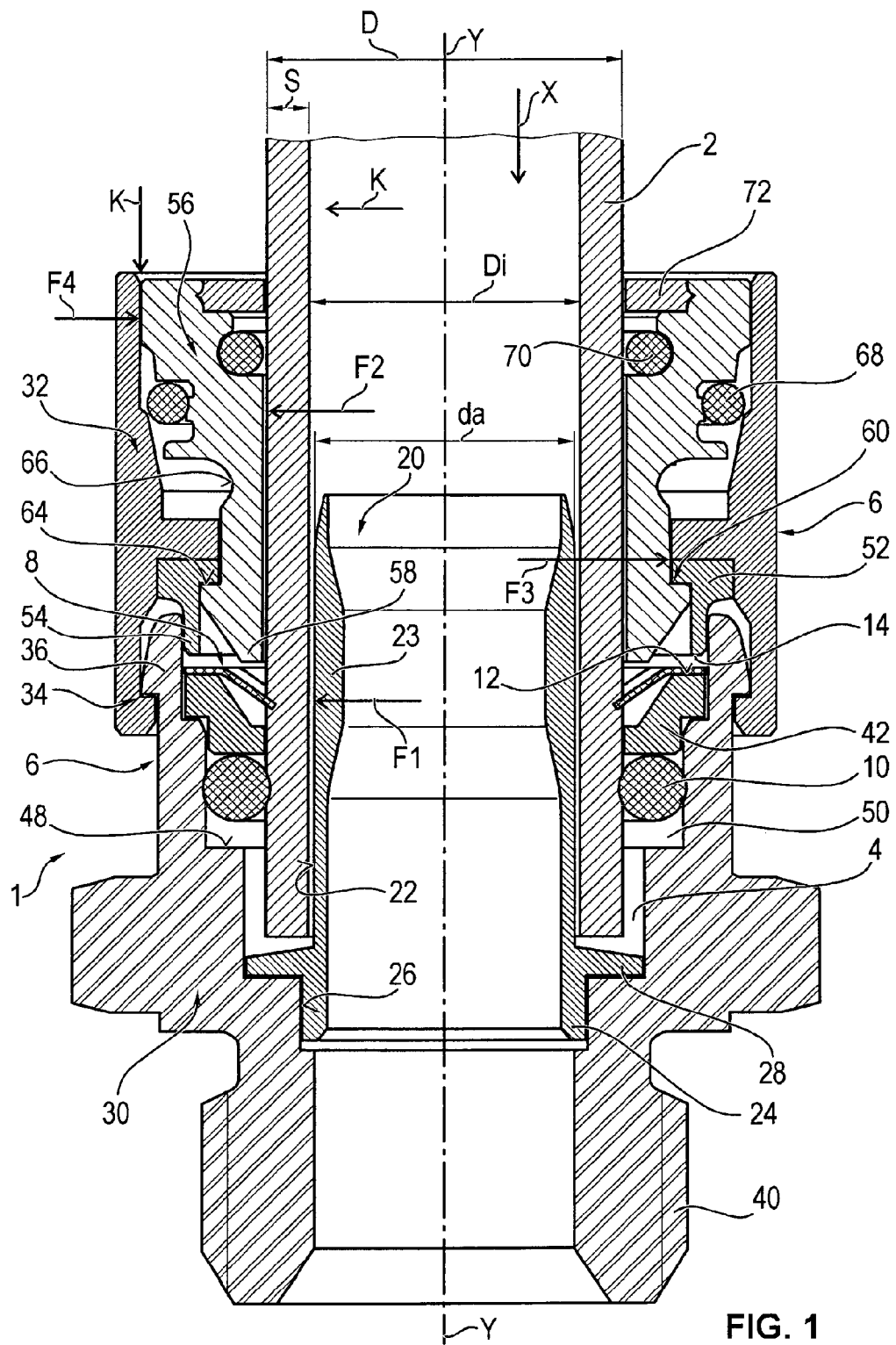
FIG. 1 shows an axial section through a preferred embodiment of a connection device with a line end inserted therein.

It is expressly emphasized with reference to the following description that the invention is not limited to the exemplary embodiments and, for that matter, to all or several features of the described feature combinations. Rather, each individual partial feature of the/each exemplary embodiment can have inventive significance also per se, separately from all other partial features described in connection therewith, and also in combination with any features of another exemplary embodiment as well as independently of the feature combinations and back-references of the claims.

First, a preferred embodiment of a connection device 1 will be described in more detail with reference to FIGS. 1 and 2. This connection device 1 provides a fast and preferably also releasable connection of a media line 2 by simply inserting a line end into a receiving opening 4 of a connecting element 6. The insertion direction is shown with an arrow X in FIG. 1. Since there is no connecting pin for attachment of the media line 2, it can also be called a "pinless plug-in system."

Specific inner parts 5 (see FIG. 2), which interact with the media line 2 in particular for axial guidance, mechanical locking to prevent unintentional release, peripheral sealing, and, if required, inner radial support, and preferably also for an intentional release process, are mounted inside the receiving opening 4 of the connecting element 6.

A retaining element, which is configured as a spring elastic toothed ring 8 with an outer peripheral area 8a and with several retaining teeth 8b distributed over the periphery, extending radially inward and inclined transversally in the insertion direction X and thus configured with friction and/or positive locking in the manner of a barbed hook against the outer peripheral surface of the media line 2, is mounted within the receiving opening 4 in order to lock the inserted media line 2 to prevent withdrawal. At least one peripheral seal 10, which seals an annular gap relative to the outside radially between the media line 2 and the connecting element 6, is additionally mounted within the connecting element 6 in order to seal the inserted media line 2 relative to the outside. The peripheral seal 10 is thus located radially directly between the media line 2 and the connecting element 6 and thus completely seals the connecting element 6 relative to the outside as single media seal.

The outer peripheral area 8a of the toothed ring 8 rests in undeformed state in a vertical plane with respect to the longitudinal axis Y of the connection device 1, while the retaining teeth 8b rest jointly on a cone as a result of their inclined position. The retaining teeth 8b in undeformed state define with their inner retaining edges a perimeter whose diameter is smaller than the outer diameter of the media line 2. As a result, the retaining edges exert a radial retaining force especially with positive locking or at least friction locking against the outer periphery of the inserted media line 2.

The toothed ring 8 is mounted with its outer peripheral area 8a with a defined limited radial movement play within the connecting element 6. This axial movement play is limited by means of bilateral axially opposite contact sections 12 and 14 within the connecting element 6. A first contact section 12 is formed on the "lower" side (FIG. 1) when viewed in the insertion direction X by means of a radial contact surface that is transverse to the longitudinal axis Y and a second contact section 14 is arranged on the axially opposite "upper" side in the radial outward area of the toothed ring 8. The contact sections 12 and 14 are axially separated from each other by an open space that is greater than the axially measured thickness of the peripheral area 8a of the toothed ring 8. From the difference "distance of contact sections 12, 14 minus thickness of the peripheral area 8a of the toothed ring 8," the axial movement or play of the toothed ring 8 is obtained. Further, the toothed ring 8 interacts—see also FIG. 5 in this regard—at the angular transition 15 between the outer peripheral area 8a and the retaining teeth 8b with a peripheral tilting edge 16 provided within the connecting element 6 on the radial inner periphery of the radial contact surface that forms the first contact section 12, such that when the media line 2 is inserted, due to the media line contact with the retaining teeth 8b, the toothed ring 8 is pivoted or twisted like a rocker about the tilting edge 16 out of a starting position in which it presses with its outer peripheral area 8a against the first "lower" contact section 12 until the outer peripheral area 8a arrives on the radial outer side for supported contact on the second, axially opposite "upper" contact section 14. The outer radial periphery of the peripheral area 8a of the toothed ring 8 that is pivoted like a rocker around the tilting edge 16, consequently lifts from the first contact section 12 and is moved against the second contact section 14. Starting from this position, an elastic flexural deformation still occurs basically only in the area of the retaining teeth 8b, which radially surmount the tilting edge 16 on the inside if the media line 2 is moved further in the insertion direction X. The insertion process is then concluded in that the media line 2 is retracted a little counter to the insertion direction X. Thus the retaining teeth 8b act with positive locking or at least friction locking on the outer periphery of line 2.

In addition, a support sleeve 20 is preferable coaxially arranged within the receiving opening 4 of the connecting element 6 in such a way that the media line 2 can be pushed toward a cylindrical outer surface 22 of the support sleeve 20 during insertion, wherein the support sleeve 20 or its cylindrical outer surface 22 has an outer diameter da that is adapted to the inner diameter Di of the media line 2 in such a way that the inserted line 2 is radially supported by the support sleeve 20, and deformations of the media line 2 within the operating range of the toothed ring 8 from a radial retaining force produced by the toothed ring 8 are prevented. It can preferably be provided herein that the support sleeve 20 has a support section 23 with greater inner wall thickness within the operating range of the toothed ring 8.

The support sleeve 20 has a cylindrical plug-in section 24 that fits into an inner socket 26 of the connecting element 6 for the purpose of retaining the support sleeve 20 inside the connecting element 6. A stop 28 for the line 2 also functions as an insertion limit for the support sleeve 20.

Another advantageous embodiment of the connection device 1 provides that the connection element 6 has a housing that is axially divided in two, with a first nozzle-like housing part 30, which is directed in the insertion direction, and a second sleeve-like housing part 32, which forms an outlet side of the receiving opening 4. The first housing part 30 can be designed as desired, for example, as a distributor with a different number of outlets, a straight through-connector (FIG. 1) as well as an angular connector or as an L-shaped, T-shaped or Y-shaped connector. The two housing parts 30, 32 are preferably connected to each other via a peripherally closed snap-on connection 34; see in particular FIG. 1. In the presented preferred embodiment, for this purpose the first housing part 30 axially and radially engages, in a form fitting manner, an inner notch-like locking recess 38 of the second housing part 32 with a plug-in section 36; see FIG. 2. The first housing part 30 can be configured as a screw-in socket with an outer thread attachment 40.

The above-described tilting edge 16 for the toothed ring 8 is advantageously formed on an insert ring 42, which also has the first contact section 12 in the form of an end face that is axially outwardly adjacent to the tilting edge 16 and vertical to the longitudinal axis Y. The tilting edge 16 is thus formed at the transition between the end face that forms the first contact section 12 and an adjacent cone surface 44; see also FIG. 5. It is further provided herein that the insert ring 42 delimits a sealing chamber 50 for the peripheral seal 10 in axial direction within the connecting element 6 with an end face 46 pointing in the insertion direction together with a flank face 48 of the connecting element 6 lying axially opposite thereto or of the first housing part 30.

The first housing part 30 is advantageously configured without undercuts on the inside in the insertion direction X. This means that the inner diameter can only be greater in the direction opposite to the insertion direction X, but cannot be smaller at any point. The inner parts 5, namely the peripheral seal 10, the insert ring 42, and the toothed ring 8 can as a consequence be mounted by means of a simple axial insertion. In addition, the peripheral seal 10 need neither be radially expanded nor radially compressed.

Figure 2:
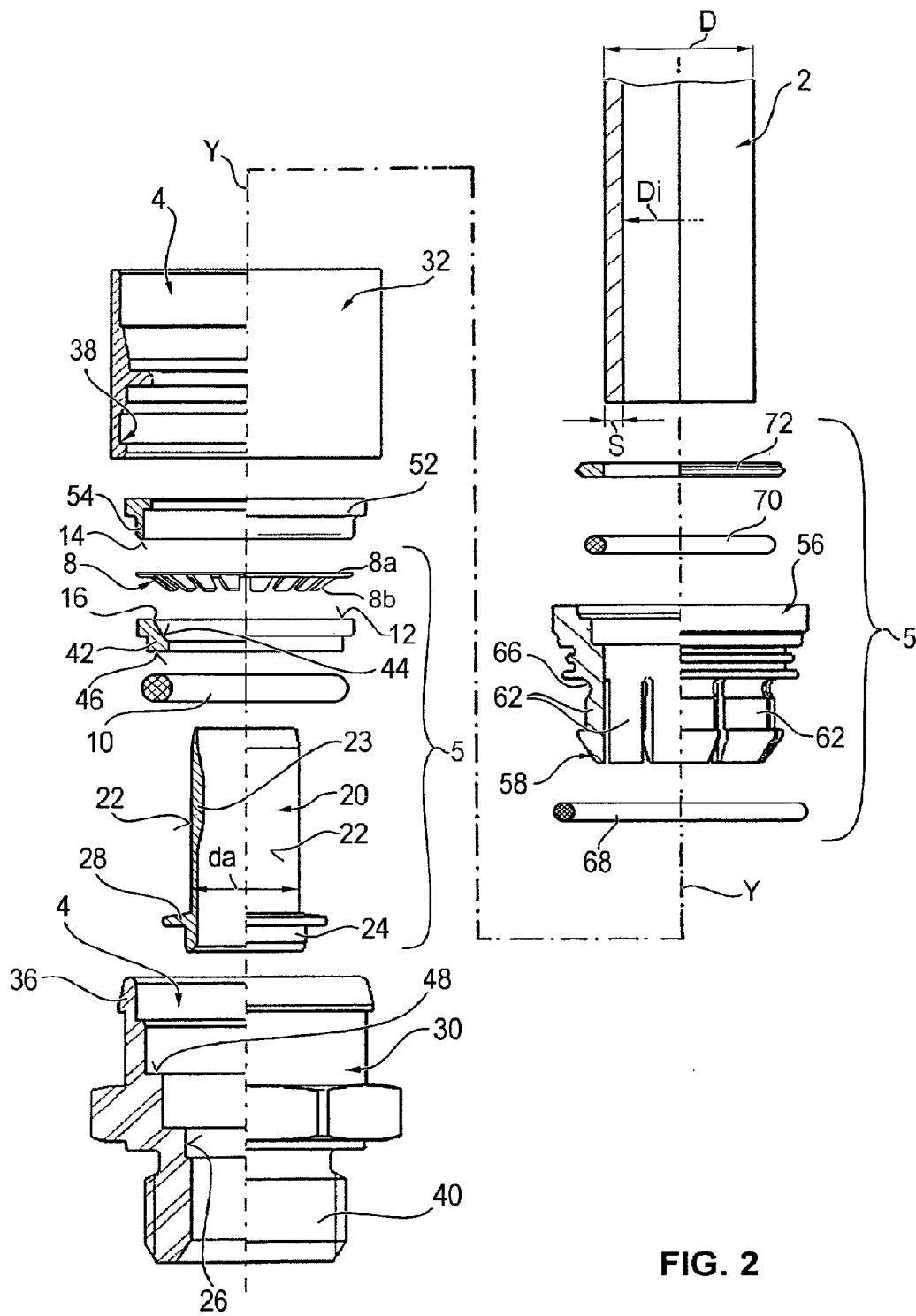
FIG. 2 shows an exploded lateral view, in reduced scale in comparison with FIG. 1, wherein the individual components are respectively partially represented in axial cross section.

The above second upper contact section 14 for the outer peripheral area 8a of the toothed ring 8 is likewise preferably formed on a ring-shaped insert element 52, which is supported within the connecting element 6 according to FIG. 1, and in particular within the second housing part 32, in the pipe release direction. The second contact section 14 is formed herein by an end face at the end side of an axially projecting annular web 54 of the insert element 52, wherein this annular web 54 preferably also engages the first housing part 30 or in its plug-in section 36.

For releasability of the inserted media line 2, which is locked by the toothed ring 8, it is advantageous to provide a sleeve-like release element 56. This release element 56 engages the connecting element 6 in an axially displaceable manner in such a way that the toothed ring can be elastically deformed by being pushed by the release element 56 in the insertion direction X so that the line 2 in the region of the retaining teeth 8b is released. For this purpose, the release element 56 works with an actuation section 58 against the retaining teeth 8b. The release element 56 prevents unintentional release of the media line 2 when a force K is exerted on the media line 2, which the force K is directed transversely to the longitudinal axis Y of the connection device or when a force is directed one-sided on the release element 56. For this purpose the release element 56 on the media line 2 and on the sleeve-shaped housing part 32 as well as the media line 2 on the release element 56 and the cylindrical outer surface 22 of the support sleeve 20 is guided in such a way—see arrows F1 to F4 in FIG. 1—that tipping of the release element 56 and thus release of the media line 2 are prevented; see FIG. 1.

Figure 3:
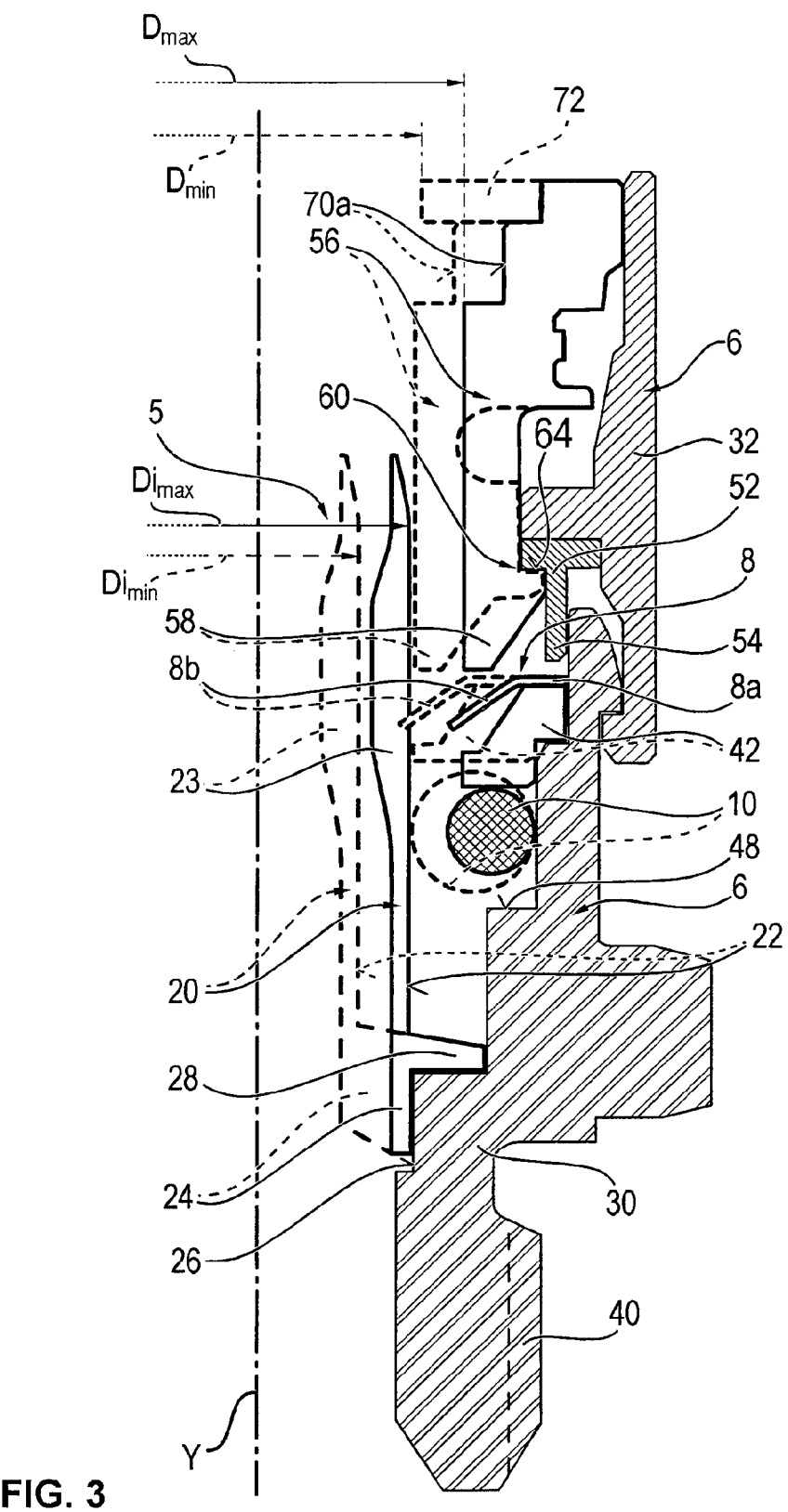
FIG. 3 shows a schematic half section of a connection device kit for illustration of different inner parts for adaptation to different media lines.
Figure 4:
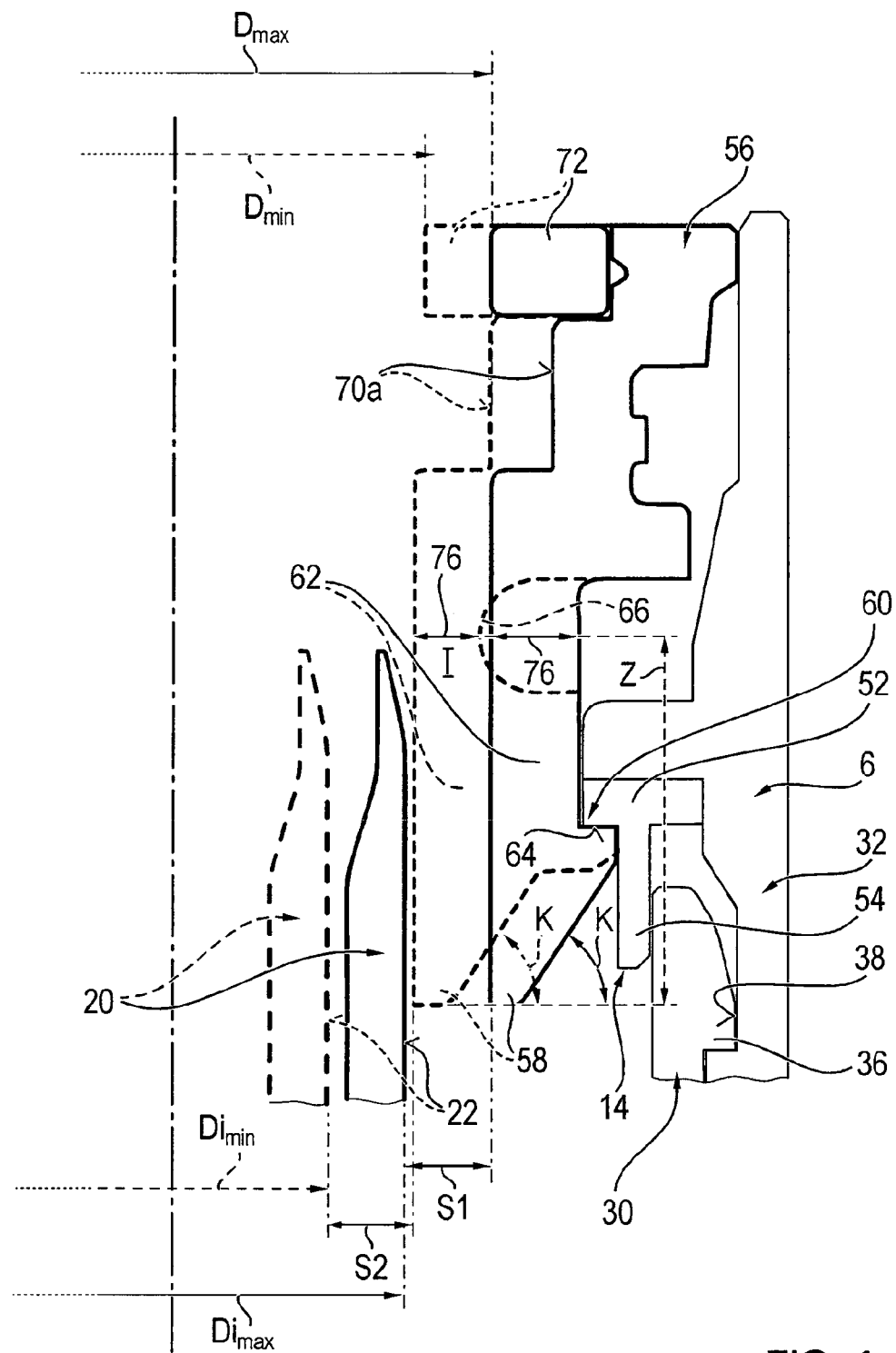
FIG. 4 shows an enlarged partial representation of FIG. 3 of the connection device kit at an upper area on the outlet side of the connection device.

The release element 56 is preferably held within the connecting element 6 by a catch mechanism 60 to prevent disassembly; see also FIG. 4. For this purpose, at the end pointing in the insertion direction X, the release element 56 is provided with locking arms 62 (FIG. 2) that with radially outwardly pointing notches engage a radial stepped surface 64 (see FIG. 1) within the connecting element 6. This stepped surface 64 is advantageously formed on the insert element 52 (see also FIGS. 3 and 4). In another advantageous embodiment, the locking arms 62 can be connected to the remaining peripherally closed ring part of the release element 56 by means of hinge-like constrictions 66, whereby the radial mobility of the locking arms 62 is improved.

Furthermore, the release element 56 has on the one hand an outer peripheral seal 68 and on the other hand an inner peripheral seal 70. The outer peripheral seal 68 serves to seal an annular gap between the sleeve-like release element 56 and the connecting element 6 or its second housing part 32. The inner peripheral seal 70 seals an annular gap in the direction of the line 2. In addition, in a preferred embodiment the outer peripheral seal 68 also functions as a spring element to generate an axial resetting force for the release element 56.

Finally, in the represented preferred modification of the connection device 1, an annular, cover-like closure element 72 is also provided for closing an annular partial opening on the outlet side of the receiving opening 4, which encloses the inserted media line 2. According to FIG. 1, this closure element 72 also seals the area of the inner peripheral seal 70. In this way the inner peripheral seal 70 can be inserted in the release element 56 in a simplified manner, since no undercut is present in this area of the release element 56. Steam jet protection is also provided by means of the closure element 72. In addition, the closure element 72 can also have at least one axially outwardly projecting attachment, not shown, as a lever for manual actuation of the release element 56.

A novel building system, a connection device kit, is now provided according to the invention for producing the connection device 1, wherein a design for different cross-sectional dimensions of the media line 2 is possible with the always identical connecting element 6. Optionally different inner parts 5, which are always identical with regard to the inner contour of the receiving opening 4, can be used for this purpose according to the invention in the connecting element 6 designed for a specific maximum outer line diameter $D_{max}$—see FIG. 4 in this regard—to fit at least two different media lines, each differ in cross-sectional dimensions. The inner parts 5 can each be adapted for this purpose, on the one hand to the always identical inner contour of the receiving opening 4 of the connecting element 6, and on the other hand to the cross-sectional dimension of one of the different media lines 2. In an advantageous embodiment, one and the same connecting element 6 can be adapted by means of different inner parts 5 to at least three and in particular six different media lines 2, which differ cross-sectional dimensions.

Figure 5:
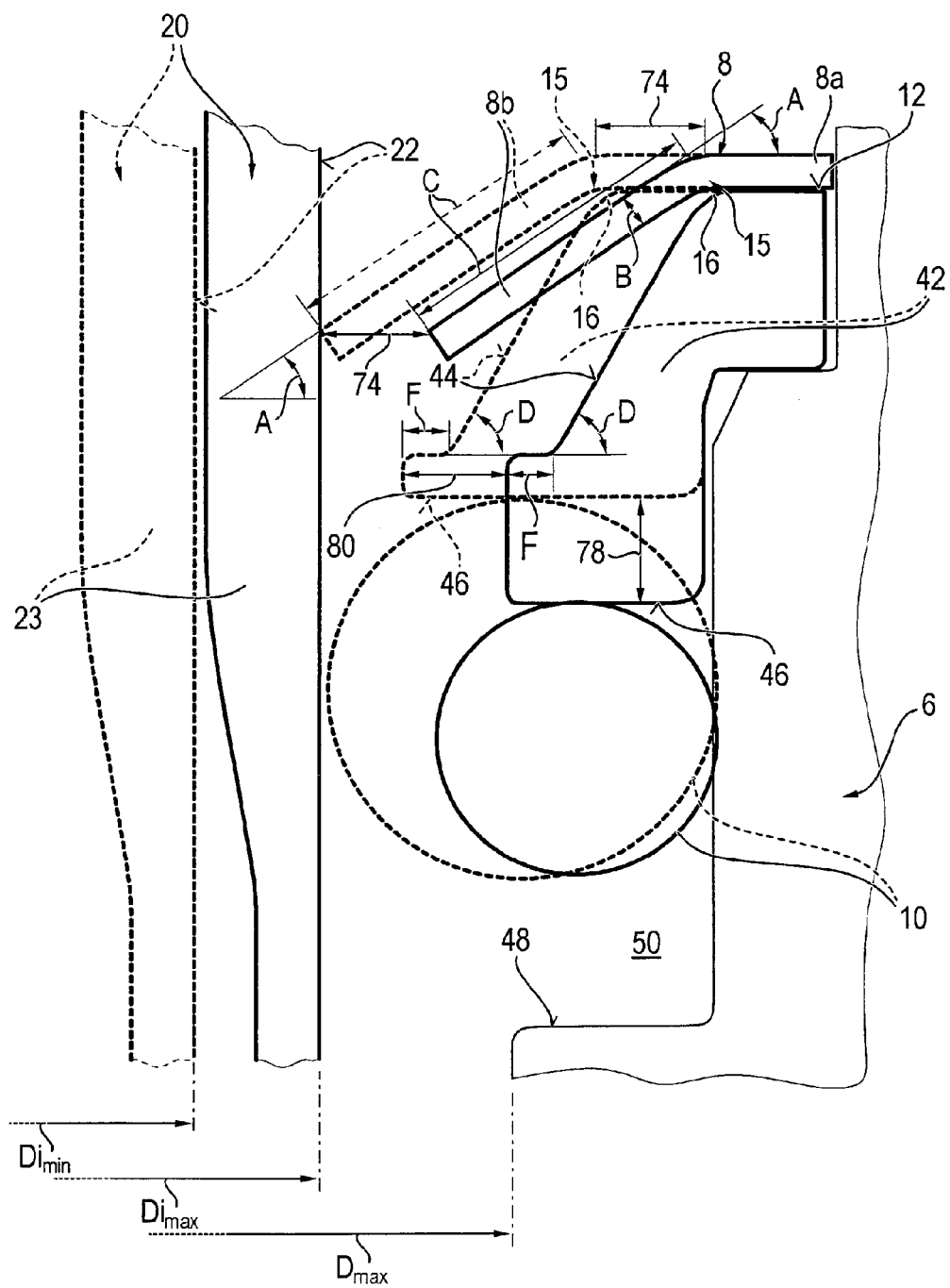
FIG. 5 shows another partial representation of FIG. 3 in a central area thereof.

As regards the toothed ring 8—see in particular the enlarged representation in FIG. 5 in this regard—it is configured in its different modifications, adapted to different media lines 2, and especially to different outer diameters D of lines, with peripheral areas 8a with different radial widths, such that the retaining teeth 8b define different diameters with their inner radial tooth edges to fit the specific outer line diameters D with proportions that remain otherwise identical with regard to teeth length and angular alignment. This means that from a practical point of view the retaining teeth 8b "wander" only in the radial direction through the outer peripheral areas 8a, differing in width, of the different toothed rings 8. This is easy to understand using the representation in FIG. 5; the possible range of dimensions is shown there with a double arrow 74. This allows adaptation of the toothed ring 8 for an area of the outer line diameter D between a specific maximum diameter $D_{max}$ and a specific minimum diameter $D_{min}$ according to FIG. 3, in particular in several steps, through at least three different toothed rings 8. Since the change of the outer line diameter D also changes the peripheral length, an adjustment of the quantity of retaining teeth 8b and/or their peripheral width and/or the peripheral width of the tooth gaps must also take place in modifications of the specific adapted toothed ring 8 in order to achieve identical proportions of the retaining teeth 8b with regard to angular inclination, length, and thus deformation behavior.

Further, as regards the peripheral seal 10—see in particular FIGS. 3 and 5 in this regard—it is configured in several embodiments that are fitted to different outer line diameters D, where these embodiments provide differently dimensioned ring cross sections and inner diameters respectively adapted to different outer line diameters D where the outer diameter of the peripheral seal 10 is always the same. A peripheral seal 10 is shown in a solid line in FIGS. 3 and 5 with a smaller annular cross section for a design for the largest outer line diameter $D_{max}$, while a design of the peripheral seal 10 for the smaller outer line diameter $D_{min}$ is represented with broken lines. Any desired subdivisions are also possible here.

Furthermore, different release elements 56 must be made available for the different line cross sections. It is provided for this purpose that the release element 56 define different inner diameters adapted to the respective outer line diameters D in different modifications, with the outer contour remaining unchanged. The end actuation section 58, pointing in the insertion direction, is always in the radial position in the area of the retaining teeth 8b of the corresponding toothed ring 8. Further, the locking arms 62 of the release element 56 always have identical spring properties, with constant deformation length and identical articulated areas in their different modifications. The radial measured width 1 of the locking arms 62 in the area of the above constrictions 66 is in particular always constant for that purpose in all modifications. This is shown in FIG. 4 by means of double arrows 76 and by means of the reference letter 1. The release force can likewise remain constant as a result of the variation in quantity of locking arms 62 in different line sections. This is also advantageously achieved in combination with the spring properties by means of the constant radial width 1 of the locking arms 62.

The above outer peripheral seal 68 of the release element 56 for sealing the annular gap in the direction of the connecting element 6 is identical in all modifications. The inner peripheral seal 70 indeed has accordingly different inner diameters with preferably identical ring cross section (the same "cord thickness") in the different modifications adapted to the different outer line diameters D. An inner contact area 70a of the release element 56 for the inner peripheral seal 70 can be accordingly modified; see FIG. 3 in this regard.

Other important adjustments are carried out in the area of the insert ring 42; see FIG. 5 in this regard. The result is that the insertion ring 42 is configured, on the one hand, on the side of the toothed ring 8 to fit its different modifications with end faces of different radial width in different modifications, so that the tilting edge 16 is always in the transition 15 at the start of the retaining teeth 8b. The above cone surface 44 likewise "wanders" only in the radial direction with the same length and angular inclination. On the other hand, the insertion ring 42 is also configured with different length in the axial direction; this is to fit different peripheral seals 10 for any required so-called "groove filling" (degree of filling of the sealing chamber 50) for optimal seal compression by accordingly varying the axial width of the sealing chamber 50; see the double arrow 78 in FIG. 5 in this regard. In addition, the end face 46 of the insert ring 42, which axially delimits the sealing chamber 50, is adjusted in radial width to the outer line diameter D in such a way (see the double arrow 80) that a radial gap between the media line 2 and the annular area having the end face 46 is dimensioned so small that the peripheral seal 10 cannot possibly be pressed under media pressure into the gap between the line 2 and the insert ring 42 (minimization of a so-called gap extrusion).

A further adjustment takes place in the area of the closure element 72, in that the latter is adjusted to the respective media line 2 with regard to its inner diameter in its different modifications. Reference is made in particular to FIGS. 3 and 4 in this regard.

Figure 6:
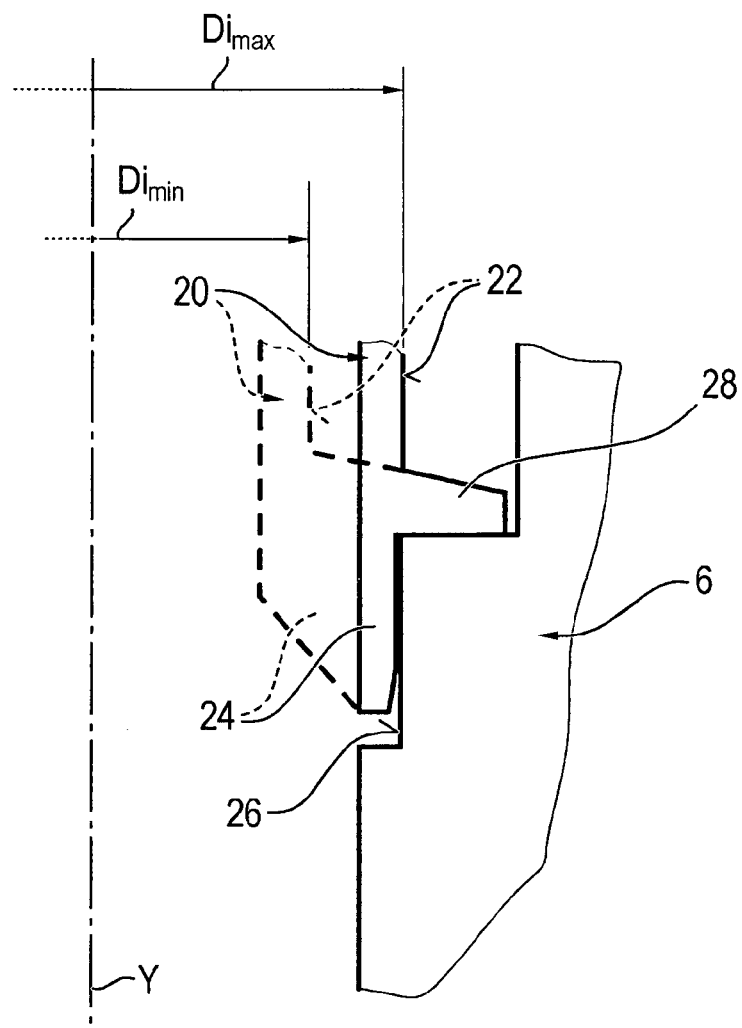
FIG. 6 shows another partial section of FIG. 3 in a lower area opposite to the outlet side.

As for the support sleeve 20, it must be especially adjusted to the respective inner line diameter Di in the area between a largest inner diameter $Di_{max}$ and a smallest inner diameter $Di_{min}$; see FIGS. 3 and 4 in this regard. The cylindrical outer surface 22 with a corresponding outer diameter "da" is configured for this purpose; see FIGS. 1 and 2. The insert section 24 provided for retention as well as preferably also the stop 28 are identical in all modifications, however; see in particular FIG. 6.

The previous description suggests that the following inner parts 5 are used in adapted modifications in the always identical connecting elements 6 for adjustment to different outer line diameters D: peripheral seal 10, insert ring 42, and toothed ring 8, as well as release element 56 with peripheral seals 68, 70 and the closure element 72. Adjustment to the inner line diameter Di can also take place—also alternatively—by using an adapted modification of the support sleeve 20. The insert element 52 is identical within a "cluster" in all modifications and belongs therefore in fact to the inner contour of the receiving opening 4 of the connecting element 6.

It is further noted that the measurements entered in FIGS. 4 and 5 and respectively identified with the same upper case reference letters are also respectively interpreted in the same way in the differently dimensioned inner parts 5.

Finally it should be remarked in a general way that only two different designs of the inner parts 5 are illustrated in the representations of FIGS. 3 to 6. They are the two extremes, although other intermediate designs are possible. Thus the connecting element 6, for example, can be designed with an inner contour for a maximum outer line diameter $D_{max}$ of 10 mm. Lines 2 with an outer diameter of 9 mm, 8 mm as well as optionally intermediate sizes of, for example, ⅜" can be connected by means of different inner parts 5. Lines with different wall thicknesses S, for example, 1 mm, 1.5 mm, 1.25 mm, can be assembled herein by means of the corresponding support sleeves 20; see the measurements S1 and S2 plotted for this purpose in FIG. 4.

Any other intermediate sizes as well as any desired designs for other groups of differing media lines 2 with any desired intermediate sizes are naturally also possible. The invention also allows adjustment to more than six media lines 2, different in cross-sectional length, within the "cluster" group.

Equal or at least very similar properties with regard to the mechanical support of the line 2 and behavior during release of the line 2 as well as with regard to the sealing properties can be advantageously achieved by means of the aforementioned measures within a/each "cluster" group with the same connecting element 6, that is, the same housing parts 30, 32, for several different media lines 2, which differ in cross-sectional dimensions, specifically the outer and/or inner diameter.

A sealing system with at least approximately the same degree of filling and the same seal compression is created for sealing by means of the following features:

Constant outer diameter of the peripheral seal 10 functioning as single media seal for application within a sealing area of the connecting element 6 with constant inner diameter;

Always identical flank surface 48 in the connecting element 6 in the direction of the lower axial limit of the sealing chamber 50;

Different ring cross sections (cord thicknesses) of the peripheral seal 10 for adaptation of the inner seal diameter to the outer line diameter;

Differing radial width of the end faces 46 of the insert ring 42 for upper axial limitation of the sealing chamber 50 and prevention or at least minimization of a so-called gap extrusion of the peripheral seal 10;

Different axial lengths of the insert ring 42 for optimal seal compression over the end face 46;

Always identical outer peripheral seal 68 functioning as dirt seal;

Always identical ring cross section (cord thickness) of the inner peripheral seal 70 functioning as dirt seal with differently adjusted ring diameters (inner and outer diameter); and Varying inner diameter of the contact area 70a for the inner peripheral seal 70 within the release element 56.

The following features are of importance for the constant mechanical properties:

Always the same angular alignment of the retaining teeth 8b of the toothed ring 8; and Always the same free "lever" length of the retaining teeth 8b.

The invention is not restricted to the exemplary embodiments illustrated and described, but also includes all modifications acting in the same manner within the meaning of the invention. It is expressly emphasized that the exemplary embodiments are not restricted the combination of features, but that individual partial feature has inventive importance per se also separately from all other partial features. Furthermore, the invention is also not limited to the feature combination defined in the respective independent claim, but can also be defined by any other desired combination of specific features of all individual features disclosed as a whole. This means that in principle virtually any individual feature of the respective independent claim can be omitted or replaced by at least one individual feature disclosed at another point in the application. To this extent, the claims are to be understood as merely a first formulation attempt for an invention.

The invention claimed is:

1. A connection device kit for connection with a plurality of different media lines with different cross-section sizes by insertion of a line end of the media line, the connection device kit comprising:
   a connection body having a receiving opening defining an inner contour, the connection body having two housing parts including a nozzle housing part and a sleeve housing part, the nozzle housing part and the sleeve housing part being connected to each other via a peripherally closed snap-on connection;
   a first plurality of inner parts, the first plurality of inner parts defining an outer contour engageable with the inner contour of the receiving opening and being configured to engage a first range of media lines of different cross-sectional sizes for axial guiding, mechanical locking against release, peripheral sealing and, if appropriate, for inner radial support, wherein the first plurality of inner parts includes a first ring-shaped peripheral seal, a first tiltable retaining ring, and a first insert ring;
   a second plurality of inner parts, the second plurality of inner parts defining an outer contour engageable with the inner contour of the receiving opening and being configured to engage a second range of media line of different cross-sectional size for axial guiding, mechanical locking against release, peripheral sealing and, if appropriate, for inner radial support, wherein the second plurality of inner parts includes a second ring-shaped peripheral seal, a second tiltable retaining ring, and a second insert ring;
   the first and second peripheral seals each being respectively configured to mount on the inner contour of the receiving opening and defining an inner diameter for engagement with the outer periphery of the media line;
   the first and second insert rings respectively supporting the first and second retaining rings and having respective end faces pointing in the insertion direction, the respective end faces each axially delimiting a sealing chamber within the connecting element together with a flank face of the connecting element or of the first housing part lying axially opposite thereto, the peripheral seal being disposed in the sealing chamber;
   the first and second retaining rings provided as first and second resiliently elastic toothed rings each including an outer periphery and a plurality of retaining teeth distributed about the periphery, the retaining teeth extending radially and obliquely inwards in a line plug-in direction, the retaining teeth defining an inner diameter that is less than the inner diameter of the peripheral seal and configured for engagement against the media line; and
   the first and second insert rings each having a first contact section which has a radially different width corresponding to a respective radial width of the outer periphery of the toothed ring of the respective first and second plurality of inner parts, the first and second insert rings each having a tilting edge for the respective toothed ring whereby the first contact section is axially outwardly adjacent to the tilting edge and perpendicular to the longitudinal axis of the media line, whereby the toothed ring is mounted with its outer periphery having axial movement play within the connection body that is limited by the contact sections of the first and second insert rings and a spaced apart axially opposite contact section defined within one of the nozzle and sleeve housing parts, whereby the outer periphery toothed ring is configured to pivot about the tilting edge out of a starting position in which the outer periphery presses against the first contact section and until the outer periphery contacts the opposite contact section.

2. The connection device kit according to claim 1, wherein the first plurality and the second plurality of inner parts define in the range of three to six maximal outer line diameters.

3. The connection device kit according to claim 1, wherein
   the retaining teeth are configured for friction and positive locking against the media line, and
   the ring-shaped peripheral seal is configured to be mounted to the inner contour of the receiving opening.

4. The connection device kit according to claim 1, wherein the first and second plurality of inner parts sets further each include a sleeve-shaped release element that is configured to be axially displaceably mounted in the receiving opening of the connecting element, the release element having an end adjacent to the toothed ring and upon axial displacement being configured to engage and elastically deform the toothed ring in the area of the retaining teeth thereby releasing the media line from the connecting device.

5. The connection device kit according to claim 4, wherein the release elements of the first and second plurality of inner parts have outer contours of the same shape and define different inner diameters adapted to the respective outer line diameters (D), wherein an end of the release elements adjacent to the toothed ring is radially positioned in the area of the retaining teeth in such a way that the retaining teeth can be elastically deformed with axial movement of the release element toward the toothed ring for release of the media line.

6. The connection device kit according to claim 4, wherein the release elements retainingly engage the connecting element with locking arms, the locking arms being formed by axial slots at an end of the release elements located toward the toothed ring, the locking arms have radially outwardly pointing notches engaged behind a radial stepped surface of the connecting element.

7. The connection device kit according to claim 6, wherein the locking arms of each of the first and second inner parts sets have identical spring properties and a constant deformation length.

8. The connection device kit according to claim 4, wherein the release elements of the first and second plurality of inner parts have identical outer peripheral seals configured to sealingly engage the connecting element and further include inner peripheral seals configured to seal a radial annular gap defined in the direction of the media line, wherein the inner peripheral seals have differing inner diameters adapted to the differing outer line diameters (D).

9. The connection device kit according to claim 4, wherein a ring-shaped closure element is supported by each of the release elements on an outlet side of the connection device for closing an annular opening about an inserted media line, wherein the closure elements have an inner diameter corresponding to the inner diameter of the release element.

10. The connection device kit according to claim 1, wherein the first and second insert rings each also having an end face defining a limit in the axial direction of a sealing chamber in which the peripheral seal is received, the sealing chamber being also partially defined by the inner contour of the receiving opening.

11. The connection device kit according to claim 10, wherein the insert rings of the first and second plurality of inner parts have different radial widths corresponding to the respective radial widths of the outer peripheral areas of the respective corresponding toothed rings and are configured with differing lengths for adaptation to the different peripheral seals for a specifically required seal compression in the axial direction to limit the sealing chamber as well as with different radial widths for minimization of a radial gap between the media line and the insert ring in the area of the end face that limits the sealing chamber.

12. The connection device kit according to claim 1, wherein the first and second plurality of inner parts each include a support sleeve configured to be coaxially arranged within the receiving opening of the connecting element, the support sleeve having a cylindrical outer surface spaced radially inward from the retaining element and peripheral seal and defining a radial support for the media line during insertion.

13. The connection device kits according to claim 12, wherein the support sleeves of the first and second plurality of inner parts have identical retaining sections configured for engagement with the connecting element, and have sleeve-shaped support sections defining the outer cylindrical surface and having differing outer diameters (da) to adapt to the respective inner diameter (Di) of the corresponding media line.

14. The connection device kit according to claim 1, wherein the outer peripheral areas of each of the toothed rings are dimensioned with differing radial widths and the retaining teeth are of the same length and angular alignment such that the retaining teeth define differing diameters with their inner radial tooth edges in adaptation to the respective outer line diameters (D).

15. The connection device kit according to claim 1, wherein the peripheral seals of the first and second plurality of inner parts have the same outer diameters and have different-sized ring cross sections and define different inner diameters adapted to the specific outer line diameters (D).

16. The connection device kit according to claim 1, wherein the first and second plurality of inner parts each include a release element, the release element and the connecting element being configured such that relative tipping of the release element and the connecting element are prevented.

* * * * *